Jan. 2, 1940.          P. LUFT            2,185,673
                    CUTTING TOOL
                  Filed Jan. 20, 1938
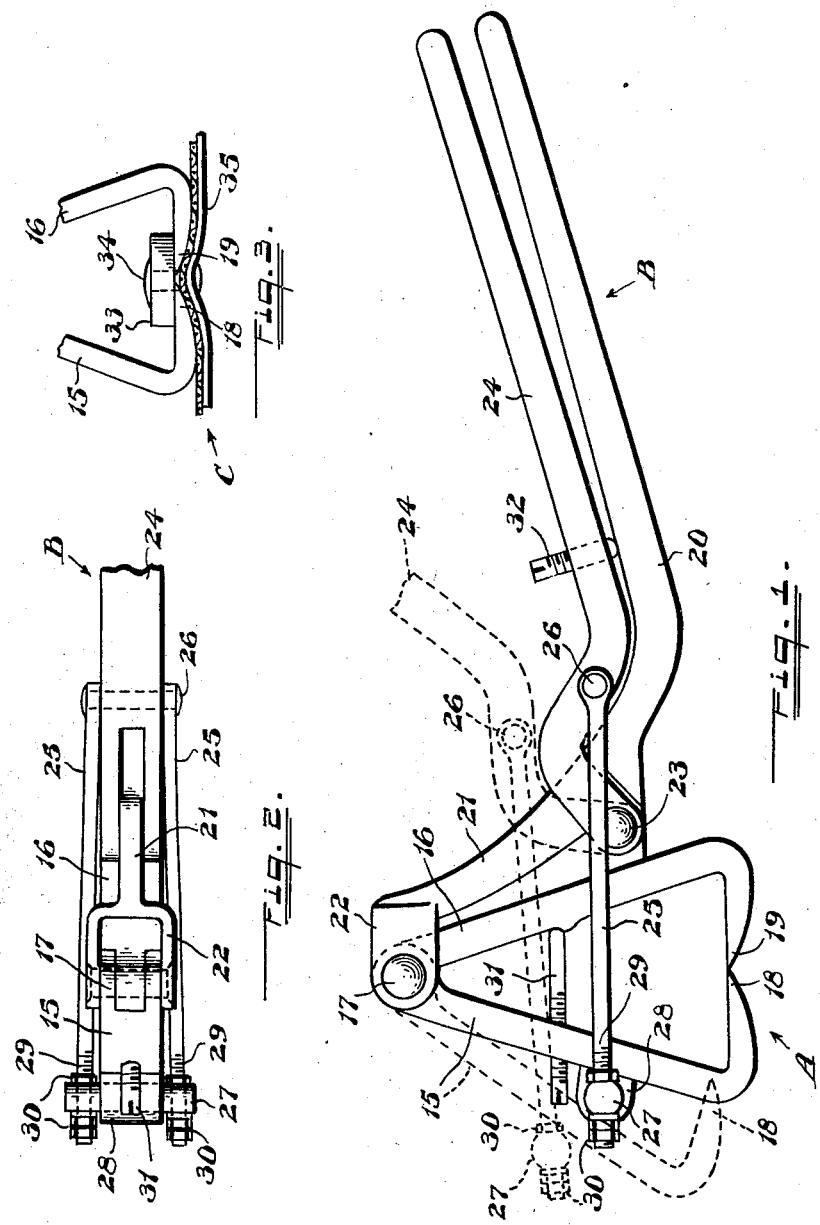
INVENTOR.
PETER LUFT.
BY
ATTORNEY.

Patented Jan. 2, 1940

2,185,673

UNITED STATES PATENT OFFICE 2,185,673

CUTTING TOOL

Peter Luft, Aylsham, Saskatchewan, Canada, assignor of one-fourth to Andrew Ostlund, Aylsham, Saskatchewan, Canada Application January 20, 1938, Serial No. 185,977
In Canada February 9, 1937

2 Claims. (Cl. 30—190)

This invention relates to cutting tools and has more particular reference to that type of device employed for cutting or severing rivets, bolts, wire or the like and especially a tool adapted to sever close to or between articles fastened together by rivet or like means such for example as the cutting of rivets which secure slats to a conveyor canvas.

Ordinarily, conveyor slats for grain binders, harvesters, grain separators and the like are attached to a conveyor canvas by means of rivets. From time to time these slats become worn or broken or for some other reason require replacement. Owing to the method of securing these slats to the conveyor canvas it is difficult to remove them without tearing or otherwise damaging the canvas, as a result, upon the removal of the slat or slats with ordinary tools the canvas and other elements invariably are no longer useful for the purpose required. This obviously necessitates replacement of the canvas entailing considerable expense and not infrequently results in considerable loss of time through idleness of the machine awaiting replacement parts.

With the present invention the foregoing and other objections and disadvantages are overcome in a simple and practical manner, therefore, one of the objects of the present invention contemplates a device of this character which will sever holding means such as rivets and like devices ordinarily employed for securing purposes.

Another object of the present invention is to provide a device of this character which will permit the insertion of the cutting edges of the tool between the joined articles so that the cutting operation will not damage or destroy the articles during the severing of the rivets.

A further object of the invention is to provide a device of this character which will effect a substantially wedge like action that partially separates the connected articles preliminary to the rivet severing operation.

A still further object of the invention is to provide a device of this character which in operation will permit the cutting tool to straddle the fastened article during progressive operation.

Yet a further object of the invention is to provide a tool of this character which embodies a variable leverage which is substantially compounded when the cutting or severance point is reached.

Other objects and advantages of the invention will become apparent as the description proceeds, the invention itself consisting in the novel combination and arrangement of parts hereinafter described in detail and illustrated in the accompanying drawing in which;

Fig. 1 is a side view of my improved cutting tool, the dotted lines indicating an open position of the operating parts.

Fig. 2 is a plan view of Fig. 1 with a portion of the handle means broken away, and Fig. 3 is a side view of the cutting elements in position ready to sever holding means such as bolts or rivets which bind or secure a slat to a canvas conveyor.

Referring now to the details in structure disclosed in the accompanying drawing in which like letters and numerals of reference designate corresponding parts in the various views, the letter A indicates the cutting assembly, the letter B the handle operating means as a whole and the letter C a portion of a canvas conveyor which in this instance is employed for purposes of illustration.

The cutting assembly comprises the pair of substantially L-shaped or angle-shaped arm members 15 and 16 which when in pivotally associated and closed position follow substantially the form of a triangle. These arms are pivotally connected at one extremity of each as at 17 and at the base thereof terminate in the form of cutting or severing portions or edges 18 and 19.

Secured to the arm 16 in any suitable manner and extending laterally outwardly therefrom intermediate the pivot and cutting portions is a stationary handle member 20. This handle may be provided with an extension piece 21 which terminates in the form of a yoke 22 adapted to straddle and be secured to the arm members 15 and 16 at their pivotal point 17. Pivotally connected to the handle 20 as indicated at 23 is a swingably movable handle 24. Means for connecting the movable handle to the arm 15 includes connecting rods 25 pivotally connected to such handle as at 26 and having their opposing ends connected to a stub shaft 27 rotatably mounted in a hub 28 which in turn is carried by the arm 15 intermediate its pivot and cutting portions. As observed in Fig. 2 the stub shaft 27 is rotatable in its hub mounting thus providing a substantially swivel connection at this point for the arm 15.

The extremities of the connecting rods connecting the shaft 27 are threaded as indicated at 29 and provided with lock nuts 30 which enable the arm members and consequently the cutting elements 18 and 19 to be adjusted in relation to one another.

Additional means for regulating and adjusting the cutting effect of the tool may be provided in the form of a set screw or the like 31 extending through the arm 15 while a further set screw may be provided for the arm 24 as indicated at 32. Thus the set screws in combination with the aforementioned adjusting means provide for the adjustment of the cutting elements necessitated through wear, resharpening or other conditions or where it is desirable to partly sever an article.

In Fig. 3 of the drawing I have illustrated a cutting operation as being effected where a slat is to be removed from a conveyor canvas. In this illustration the conveyor canvas is indicated by the letter C, the slat by the numeral 33 and the slat retaining or holding means is indicated by the numeral 34. A backing such as a strip of leather is indicated at 35.

During a severing operation where a slat is to be removed from a conveyor canvas or the like, the tool is opened as indicated in Fig. 1 by dotted lines, sufficiently to straddle the slat 33 and the cutting elements positioned as indicated in Fig. 3. The handle members are then operated to cause the cutting elements to move toward each other and as the elements move near the device to be severed they travel in a substantially horizontal plane. As the members 18 and 19 approach each other a wedging action is effected by the element formations which separates the canvas from close contact with the slat so that when the cutting elements reach the rivet or other fastening means, the canvas is separated from the slat. By continued pressure upon the handle members the holding means is severed without damage or injury to the canvas.

Reverting again to the operation of the tool, it will be observed that the action of the arms 15 and 16 is variable due to their novel arrangement and that of the operating handle means. At the same time it will also be observed that at certain stages the leverage action of the handle means is substantially compounded. As a consequence, the early closing operation of the cutting elements is relatively rapid in movement, then as the closing progresses, rapid movement decreases and leverage increases. Thus when the pivotal connection 26 moves from what may be termed a vertical alignment with respect to the pivotal point 23 to a point approaching horizontal alignment of these points, the leverage is compounded.

From the foregoing it will be seen that I have devised a novel, practical and useful tool which may be applied to a variety of uses and includes therein adjusting means for the tool as well as a variable and compounding action.

What I claim as my invention is:

1. A cutting tool comprising, a pair of substantially L-shaped arm members pivotally connected together at the outer ends of their longer arms with the shorter arms swingable together whereby said arm members take a substantially triangular form, said shorter arms at their ends being provided with opposed cutting edges, a fixed handle extending laterally outwardly from one of said L-shaped arm members intermediate the pivot and the cutting portions thereof and lying in a plane substantially parallel with the plane in which the jaws move to close in cutting relation, a second arm mounted at one end on said fixed arm adjacent to the associated L-shaped arm and swingable to one extreme position to lie adjacent to and substantially parallel with the fixed arm and to another position to open out angularly therefrom, a pair of connecting rod draw links pivotally and swingably connected with said swingable arm and extending on opposite sides of the pair of pivotally mounted L-shaped arm members, a stub shaft carried by the second L-shaped jaw member intermediate the pivot and the cutting portions thereof and provided with openings receiving the ends of the connecting rods, and adjustable means on said connecting rods cooperating with said stub shaft to vary the effective length of said connecting rods.

2. A cutting tool comprising, a pair of substantially L-shaped arm members pivotally connected together at the outer ends of their longer arms with the shorter arms swingable together whereby said arm members take a substantially triangular form, said shorter arms at their ends being provided with opposed cuting edges, a fixed handle extending laterally outwardly from one of said L-shaped arm members intermediate the pivot and the cutting portions thereof and lying in a plane substantially parallel with the plane in which the jaws move to close in cutting relation, a second arm pivotally mounted at one end on said fixed arm adjacent to the associated L-shaped arm and swingable to one extreme position to lie adjacent to and substantially parallel with the fixed arm and to another position to open out angularly therefrom, a pair of connecting rod draw links pivotally and swingably connected with said swingable arm and extending on opposite sides of the pair of pivotally mounted L-shaped arm members, a stub shaft carried by the second L-shaped jaw member intermediate the pivot and the cutting portions thereof and provided with openings receiving the ends of the connecting rods, adjustable means on said connecting rods cooperating with said stub shaft to vary the effective length of said connecting rods, and screw means adjustable to limit the closing of the cutting jaws of the L-shaped arm members.

PETER LUFT.